US009300829B2

(12) United States Patent
Sohara

(10) Patent No.: US 9,300,829 B2
(45) Date of Patent: Mar. 29, 2016

(54) IMAGE READING APPARATUS AND CORRECTION METHOD THEREOF

(71) Applicant: CANON KABUSHIKI KAISHA, Tokyo (JP)

(72) Inventor: Yoshitsugu Sohara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/666,073

(22) Filed: Mar. 23, 2015

(65) Prior Publication Data

US 2015/0288839 A1    Oct. 8, 2015

(30) Foreign Application Priority Data

Apr. 4, 2014    (JP) .................................. 2014-078228

(51) Int. Cl.
*H04N 1/04*    (2006.01)
*H04N 1/00*    (2006.01)

(52) U.S. Cl.
CPC ....... *H04N 1/00819* (2013.01); *H04N 1/00018* (2013.01); *H04N 1/00092* (2013.01)

(58) Field of Classification Search
CPC .............. B65H 2511/20; B65H 2513/104; B65H 2220/01; B65H 2220/02; B65H 9/002; F24J 2002/1014; F24J 2002/385; F24J 2/0444; F24J 2/07; F24J 2/10; F24J 2/145; F24J 2/38; F24J 2/40; G03G 15/235; G05B 19/232; G05B 19/404; G05B 2219/41175; G05B 2219/45187; H04N 1/00018; H04N 1/00092; H04N 1/00819

USPC .................. 358/408, 461, 474, 496; 399/395
See application file for complete search history.

(56) References Cited

U.S. PATENT DOCUMENTS

| 5,475,493 A * | 12/1995 | Yamana | H04N 1/6086 355/77 |
| 6,072,596 A * | 6/2000 | Hattori | G03B 27/588 358/401 |
| 6,106,094 A * | 8/2000 | Otani | B41J 29/393 347/19 |
| 6,198,494 B1 * | 3/2001 | Haraguchi | H04N 1/506 347/232 |

(Continued)

FOREIGN PATENT DOCUMENTS

| JP | 2009-246671 | 10/2009 |
| JP | 2011/044783 | 3/2011 |

*Primary Examiner* — Negussie Worku
(74) *Attorney, Agent, or Firm* — Fitzpatrick, Cella, Harper & Scinto

(57) ABSTRACT

In conventional image reading in a large-sized scanner using plural CIS sensors, overall linearity of an original is poor, and a shift occurs particularly at connection portions of the CIS sensors in the read image. To solve this, an image reading apparatus in which CISs are arranged zigzag, and an original is read while conveying the original by a conveyance roller in a direction different from an arrayed direction of the reading elements of the CIS sensors performs following correction. That is, a shift from an image position in a calibration sheet corresponding to a rotation angle of the conveyance roller for at each position of the CIS sensors is detected from image data obtained by reading the calibration sheet while conveying the calibration sheet by the conveyance roller. The shift is corrected.

22 Claims, 16 Drawing Sheets

(56) References Cited

U.S. PATENT DOCUMENTS

2009/0033029 A1* 2/2009 Kinoshita et al. ........ 271/265.01
2011/0228350 A1* 9/2011 Wakaura ....................... 358/474
2013/0285315 A1* 10/2013 Deno ............................ 271/226
2013/0285316 A1* 10/2013 Deno ............................ 271/229
2013/0335788 A1* 12/2013 Utsunomiya ...... H04N 1/00801
   358/474
2014/0193186 A1* 7/2014 Furuyama ..................... 399/388
2014/0218772 A1* 8/2014 Koshimizu .................... 358/461
2015/0071692 A1* 3/2015 Maruta ................. B65H 3/0669
   399/361
2015/0102555 A1* 4/2015 Deno ........................ 271/265.01

* cited by examiner

FIG. 2A
FIG. 2B
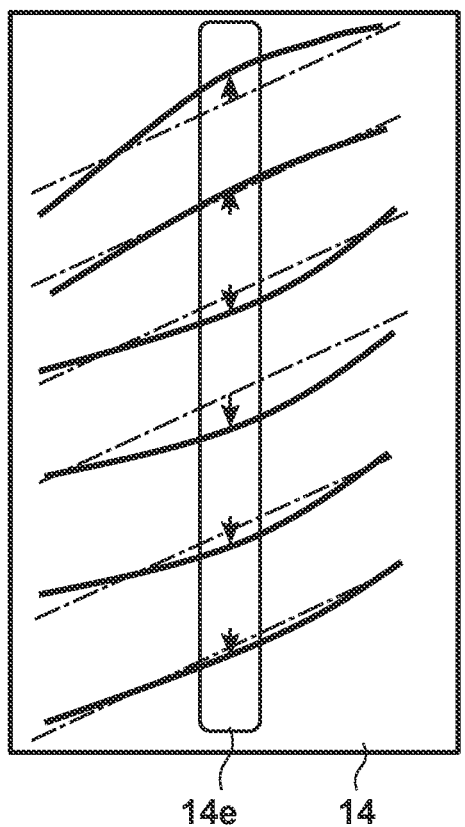
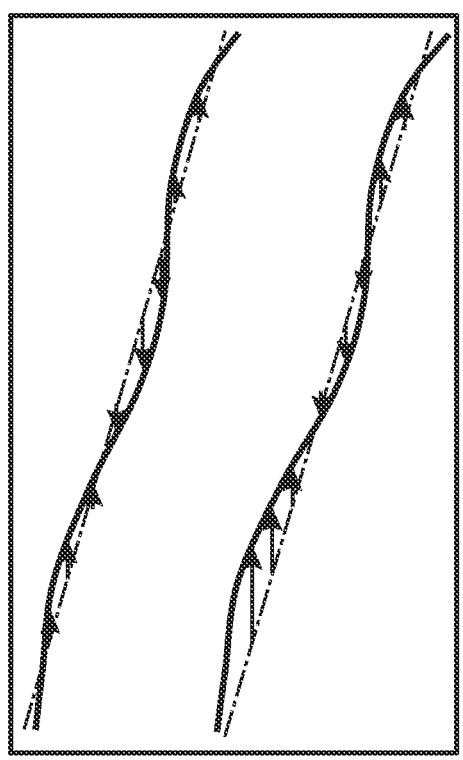

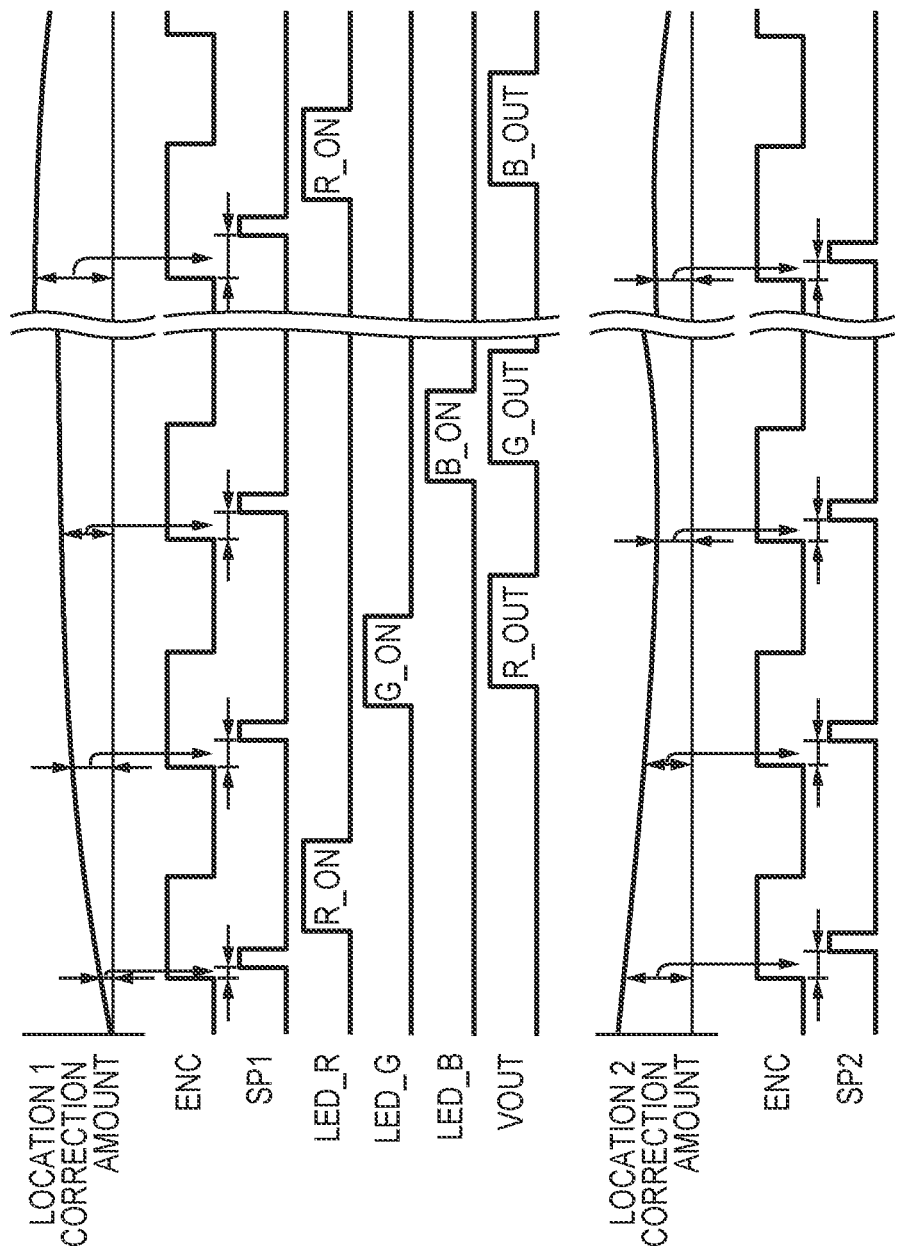

FIG. 8

| | | INITIAL STATE | | ALIGNMENT AT BOTH ENDS | | ALIGNMENT AT BOTH ENDS Rθ | | TRANSLATION TO MINIMIZE WHOLE VARIATION | | R AND θ IN WHOLE VARIATION MINIMIZATION | |
|---|---|---|---|---|---|---|---|---|---|---|---|
| | | R | θ | ΔX | ΔY | R | θ | ΔX | ΔY | R | θ |
| | | μm | deg | μm | μm | μm | deg | μm | μm | μm | deg |
| CIS_1 | P1 LEFT END | 5 | 280 | -2.3 | 6.5 | 2.2 | 133 | | | 4.5 | 257 |
| | P2 CENTER | 10 | 310 | | | 4.2 | 344 | | | 8.5 | 213 |
| | P3 RIGHT END(OVERLAPPED PORTION) | 20 | 10 | | | 20 | 30 | | | 18.3 | 13 |
| CIS_2 | P1 LEFT END(OVERLAPPED PORTION) | 20 | 30 | 0 | 0 | 20 | 30 | 0.5 | -6.0 | 18.3 | 13 |
| | P2 CENTER | 25 | 90 | | | 25 | 90 | | | 19.0 | 89 |
| | P3 RIGHT END(OVERLAPPED PORTION) | 20 | 160 | | | 20 | 160 | | | 18.3 | 177 |
| CIS_3 | P1 LEFT END(OVERLAPPED PORTION) | 20 | 130 | -5.9 | -8.5 | 20 | 160 | | | 18.3 | 177 |
| | P2 CENTER | 15 | 150 | | | 19.0 | 193 | | | 19.7 | 201 |
| | P3 RIGHT END | 5 | 60 | | | 5.4 | 230 | | | 10.6 | 254 |

F I G. 13
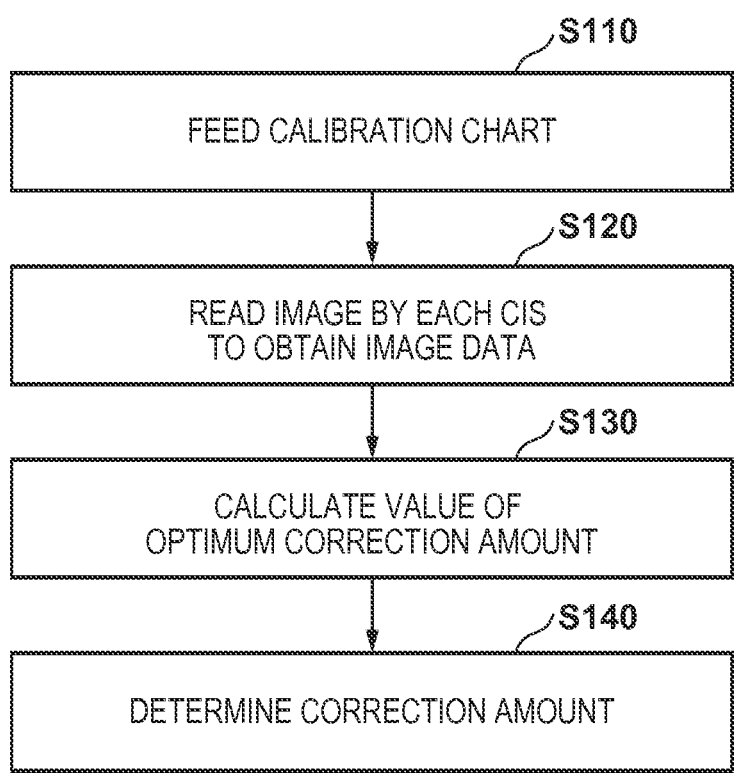

IMAGE READING APPARATUS AND CORRECTION METHOD THEREOF

BACKGROUND OF THE INVENTION

1. Field of the Invention

The present invention relates to an image reading apparatus and a correction method thereof, and particularly to, for example, an image reading apparatus that optically reads an image original using a plurality of CISs (contact line sensors) and a correction method thereof.

2. Description of the Related Art

Conventionally, a large format image reading apparatus (to be referred to as large format scanner hereinafter) for reading a large original is used to read the image of the drawing of a large building or a large machine, a large map, a large poster, or the like and store the data in a storage device or copy and print based on the data on a printing medium such as a paper sheet.

The large format scanner generally uses the image reading element of an A4 scanner that is widely available in the market, for example, a line-type reading sensor having a reading width corresponding to A4. This small line-type reading sensor has unreadable areas on both sides. To acquire a seamless image, the small line-type reading sensors are arranged zigzag, and images are connected after reading, thereby generating one large format image.

FIG. 11 is a block diagram showing the schematic arrangement of a conventional image reading apparatus.

A large format scanner uses a plurality of line-type reading sensors depending on the model difference in accordance with the size of an original to be read. An example in which three small CISs (contact image sensors) are used will be described here for the sake of simplicity. In FIG. 11, the CISs are expressed as CIS_1, CIS_2, and CIS_3.

A case where CISs are used as line-type reading sensors will be explained below.

Three CISs 2a, 2b, and 2c that are line-type reading sensors are arranged behind a conveyance roller 1 for conveying an original. An image is read at the positions of the CISs arranged zigzag. Each CIS output passes through a pixel preprocessing unit 3 formed from an A/D conversion unit, a CIS rearrangement unit, and a shading unit that should adjust the monochrome reference value, and is then input to an image processing unit 4. On the other hand, a roller angle detection unit 10 configured to detect a rotation position is provided for the conveyance roller 1. The conveyance roller 1 is connected to a motor 11 via a belt pulley so as to be rotatable by an original conveyance shaft drive unit 12 and form an original convenience unit. The roller angle detection unit 10 is connected to various drive control units 8 in a circuit board together with the original conveyance shaft drive unit 12 and various sensors 13. Image reading is performed while controlling the CISs 2a, 2b, and 2c and storing data in a memory unit 5.

In recent years, image reading needs to be done more accurately. In the image reading apparatus having the above arrangement, since a long conveyance roller is used, the bend of the roller shaft is not negligible, and the bend adversely affects image reading.

FIGS. 12A to 12D are views showing images expressed by image data obtained by reading a calibration sheet with slant lines printed on it and stored in the internal memory unit of the image reading apparatus. In the images shown in FIGS. 12A to 12D, the horizontal direction is the direction (main scanning direction) in which the reading elements of the CISs are arrayed, and the vertical direction is the original conveyance direction (sub-scanning direction). Note that the original may be actually conveyed by an ADF or the like or relatively conveyed by moving the CIS unit itself.

FIG. 12A shows an image represented by read image data 14 of CIS_1. Similarly, FIG. 12B shows an image represented by the read image data 14 of CIS_2, and FIG. 12C shows an image represented by the read image data 14 of CIS_3. Referring to FIGS. 12A to 12D, the alternate long and short dashed lines indicate slant lines that should originally be. If the conveyance roller 1 has an axis bend, as shown in FIG. 11, deviations occur in the sub-scanning direction with respect to the slant lines that should be, as shown in FIGS. 12A to 12C. As a result, images represented by the thick solid lines are obtained.

A vertically long rectangular portion 14a1 shown in FIG. 12A represents a CIS connection position of one of the CISs arranged zigzag. Similarly, FIG. 12B shows CIS connection positions 14b1 and 14b2 on both sides of a CIS, and FIG. 12C shows a CIS connection position 14c1 on the left side of a CIS. When the three images shown in FIGS. 12A to 12C are composed in this state, a composed image shown in FIG. 12D is obtained.

Discontinuity of slant lines occurs at the CIS connection positions, as indicated by 14d1 and 14d2 in FIG. 12D. In addition, the overall linearity becomes poor, as indicated by an arrow 14d3 in FIG. 12D. As described above, the challenge is to improve the accuracy after image composition. Concerning this challenge, an attempt has conventionally been made to solve the shift after image composition by contriving the reading timing of the image reading apparatus. For example, Japanese Patent Laid-Open No. 2009-246671 proposes determining the original conveyance position and starting the image reading operation based on the determination result to improve the reading accuracy at the time of acceleration/deceleration of CISs. Japanese Patent Laid-Open No. 2011-044783 discloses an arrangement limited to monochrome reading, in which the original conveyance position at the time of acceleration/deceleration of CISs is determined, and a reading activation pulse is output, as in Japanese Patent Laid-Open No. 2009-246671.

Japanese Patent Laid-Open No. 2009-246671 describes that original position detection is done not directly but using a signal from an encoder provided on the conveyance roller or the like, and the actual original conveyance position and the encoder signal have a difference. However, there is not disclosed an arrangement that changes the reading timing in the main scanning direction of reading in consideration of decentering that changes depending on the axial portion of the long conveyance roller.

Japanese Patent Laid-Open No. 2011-044783 is directed to reading of a monochrome original, and proposes that, if actual original conveyance has not reached the target, the data is discarded, and next data is employed. However, there is not disclosed an arrangement that focuses on the difference in the original conveyance speed in the main scanning direction.

As described above, the large format scanner uses a long conveyance roller. For this reason, decentering occurs in the direction of the rotation axis of the conveyance roller. The original conveyance speed is not even in the direction of the rotation axis. In addition, since the strict reading position changes in the main scanning direction of CISs, a drawn straight line on the original cannot be read as a straight line.

In the conventional large format scanner, a plurality of CISs that have a short reading width and are originally used in a scanner for reading an A4 original or the like are arranged zigzag to partially overlap the reading position in the main scanning direction. After image reading, images read by the CISs are composed. At this time, averaging processing is performed using a calibration sheet, and the images of the CISs arranged zigzag are composed. However, since the conveyance roller bends, the images at the CIS connection portions may shift at a certain instant.

SUMMARY OF THE INVENTION

Accordingly, the present invention is conceived as a response to the above-described disadvantages of the conventional art.

For example, an image reading apparatus and a correction method thereof according to this invention are capable of accurately reading an image even in a case where, for example, a long conveyance roller is used.

According to one aspect of the present invention, there is provided an image reading apparatus that reads an image of an original, comprising: a plurality of line reading sensors, each formed by arraying a plurality of reading elements, which are arranged in a direction the plurality of reading elements are arrayed and used for reading the image of the original; a conveyance roller for conveying the original in a direction different from the direction in which the plurality of reading elements are arrayed; a drive unit configured to drive the conveyance roller; and a correction unit configured to detect a shift from an image position in a predetermined calibration sheet corresponding to a rotation angle of the conveyance roller, for each of a plurality of positions of the plurality of line-type reading sensors, from image data obtained by reading the calibration sheet by the plurality of line-type reading sensors while causing the drive unit to drive the conveyance roller and conveying the calibration sheet, and correct the shift.

According to another aspect of the present invention, there is provided a correction method of an image reading apparatus that arrays a plurality of reading elements to form a line-type reading sensor, arranges a plurality of line-type reading sensors in a direction in which the plurality of reading elements are arrayed, and reads an image of an original by the plurality of line-type reading sensors while conveying the original in a direction different from the direction in which the plurality of reading elements are arrayed. The method comprises detecting a shift from an image position in a predetermined calibration sheet corresponding to a rotation angle of the conveyance roller, for each of a plurality of positions of the plurality of line-type reading sensors, from image data obtained by reading the calibration sheet by the plurality of line-type reading sensors while causing a drive unit to drive the conveyance roller and conveying the calibration sheet, and correcting the shift.

The invention is particularly advantageous since an image can accurately be read even in a case where an original is conveyed using a long conveyance roller.

Further features of the present invention will become apparent from the following description of exemplary embodiments (with reference to the attached drawings).

BRIEF DESCRIPTION OF THE DRAWINGS

FIGS. 2A and 2B are views showing images expressed by image data obtained from a calibration sheet.

FIG. 4 is a timing chart showing a method of adding actual timing adjustment times of a CIS.

FIG. 8 is a table showing correction states before and after various kinds of correction at each decentering position of CIS_1, CIS_2, and CIS_3.

FIG. 13 is a flowchart showing the general process of correcting shaft center positions shown in FIGS. 9A, 9B and 9C.

DESCRIPTION OF THE EMBODIMENTS

Figure 1:
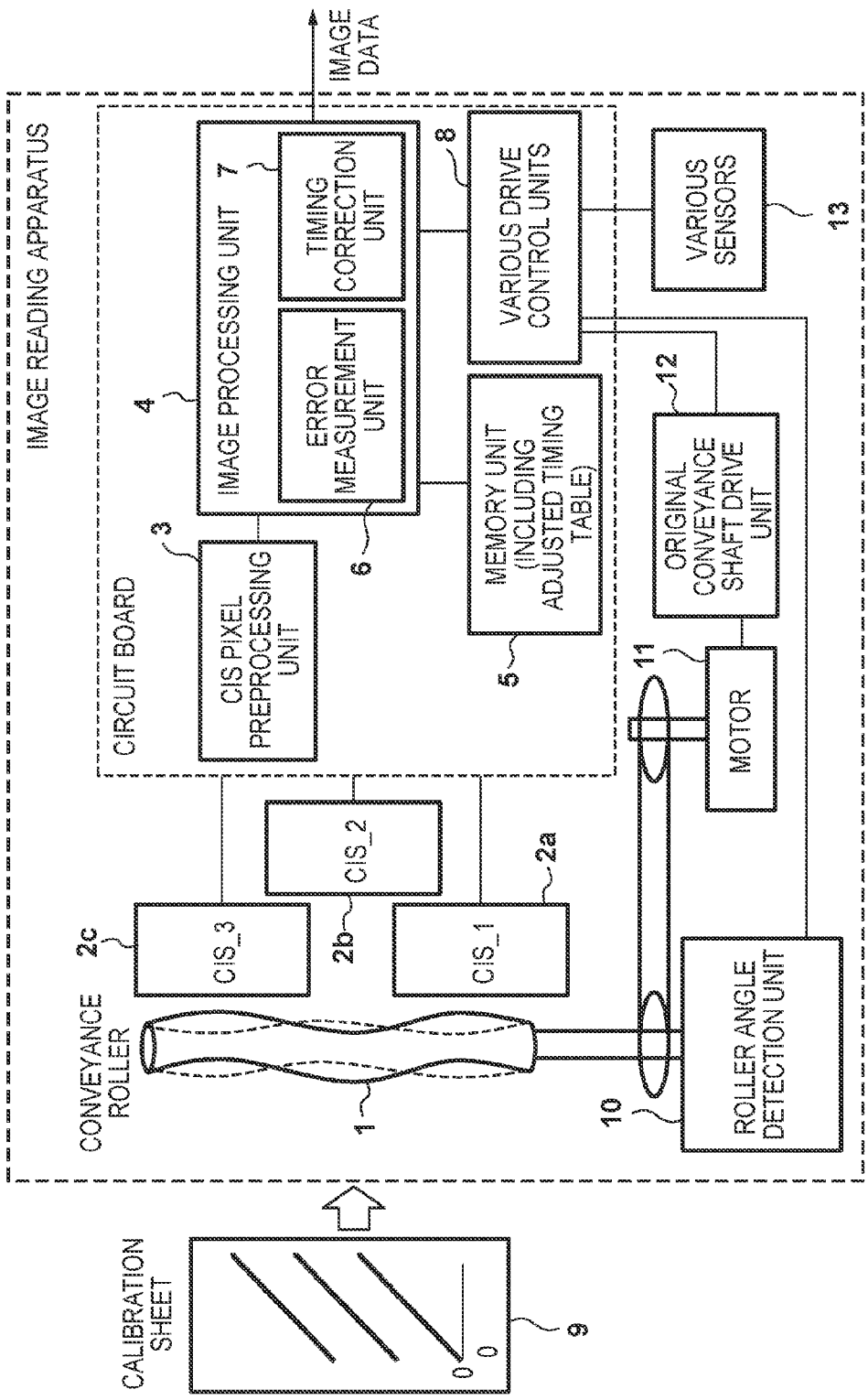
FIG. 1 is a block diagram showing the schematic arrangement of an image reading apparatus according to an exemplary embodiment of the present invention.

Exemplary embodiments of the present invention will now be described in detail in accordance with the accompanying drawings. Note that the same reference numerals denote already explained portions, and a repetitive description will be omitted.

Figure 11:
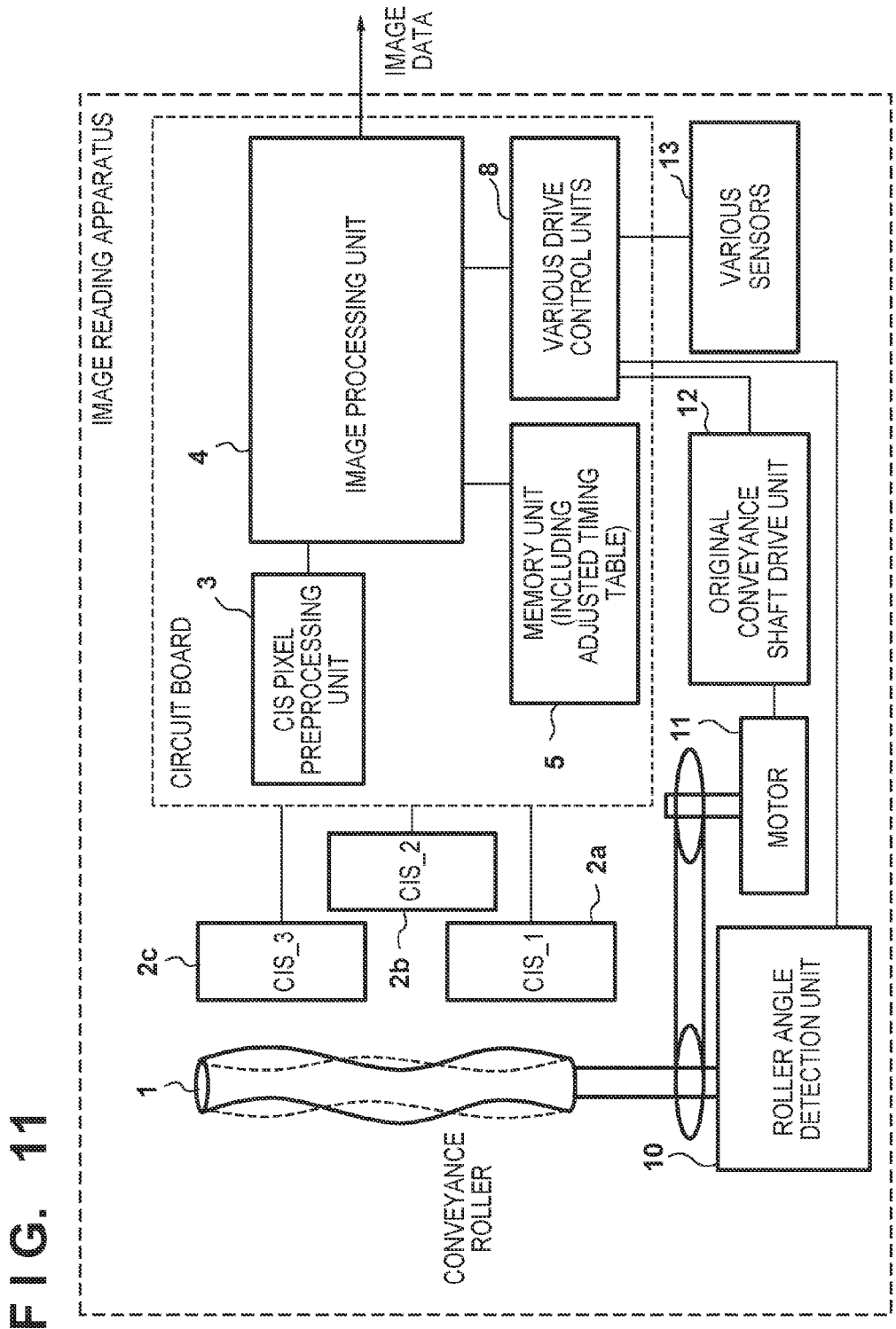
FIG. 11 is a block diagram showing the schematic arrangement of a conventional image reading apparatus.
Figure 12:
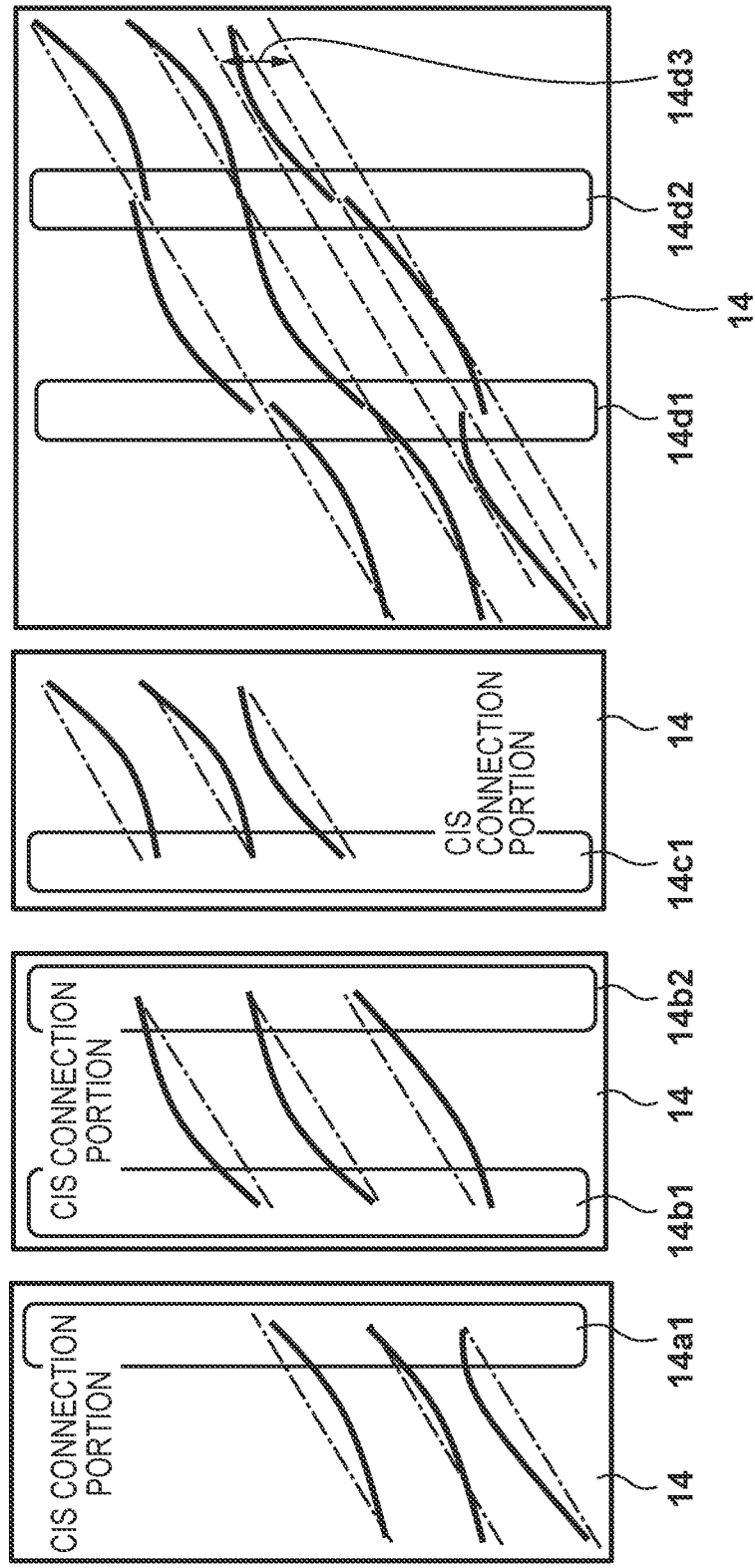
FIGS. 12A, 12B, 12C, and 12D are views showing examples of images obtained by reading of the image reading apparatus shown in FIG. 11.

FIG. 1 is a block diagram showing the schematic arrangement of an image reading apparatus according to an exemplary embodiment of the present invention. Note that the same reference numerals as in the related art shown in FIG. 11 denote the same constituent elements, and a description thereof will be omitted. In the image reading apparatus, three CISs (image contact sensors) (CIS_1, CIS_2, and CIS_3) 2a, 2b, and 2c serving as line-type reading sensors are arranged zigzag to implement a long reading width. An image original can be actually conveyed by driving the motor of an automatic conveyance mechanism such as an ADF or relatively conveyed by moving the CIS unit itself, as mentioned in the related art.

However, this embodiment employs an arrangement that, upon reading an image original of a large format, fixes the line-type reading sensors and drives a motor 11 to convey the original by a conveyance roller 1.

As described in the related art, an error measurement unit 6 in an image processing unit 4 measures a deviation with respect to a slant line at a predetermined position, based on image data obtained by reading a calibration sheet 9 by each CIS. Based on this, the reading timing of each CIS to be corrected is calculated, and the adjusted timing table is stored in the adjusted timing table of a memory unit 5. The actual reading activation timing of each CIS is corrected by adding a value in the adjusted timing table to the output of a roller angle detection unit 10. The reading deviation of a slant line position that should be at the time of reading of the calibration sheet 9 can thus be corrected to a predetermined deviation.

FIGS. 2A and 2B are views showing images represented by image data obtained from the calibration sheet.

The images shown in FIGS. 2A and 2B are represented by image data obtained by CIS_1. The images are represented by image data before composition of image data obtained from the CISs. Referring to FIGS. 2A and 2B, the vertical direction corresponds to the conveyance direction of an original, and the horizontal direction corresponds to the main scanning direction of the CISs. Referring to FIGS. 2A and 2B, the alternate long and short dashed lines indicate slant lines (straight lines) that should originally be. Deviations occur with respect to the straight lines that should be due to the bending of the conveyance roller 1, and curves as indicated by the thick solid lines are formed.

FIG. 2A shows a processing method for measuring a deviation at a point 14e in a case where a plurality of slant lines (a plurality of alternate long and short dashed lines) are drawn. Here, discrete data at the position 14e in the main scanning direction are obtained. When errors in time series are interpolated by processing the obtained data, and the correction values are set, an adjusted timing table can freely be created.

FIG. 2B shows a method of setting the width at a certain acquisition point to a certain value and continuously obtaining deviation data within the range of the width. In this example, the output of CIS_1 is divided into left and right halves, and averaging processing is executed for a deviation (deflection) from a position that should be within the range. In this example, direct deviation data can continuously be obtained, and the adjusted timing table can be created without interpolation.

The adjustment amount (correction amount) upon reading the calibration sheet will be described next.

Figure 3A:
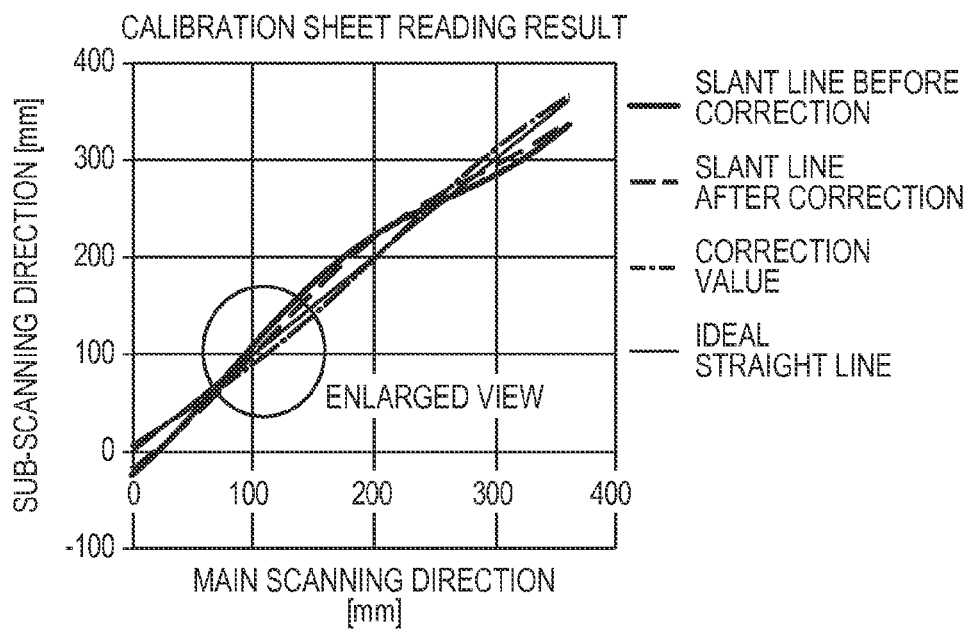
FIGS. 3A, 3B, and 3C are graphs showing calibration sheet reading results.
Figure 3B:
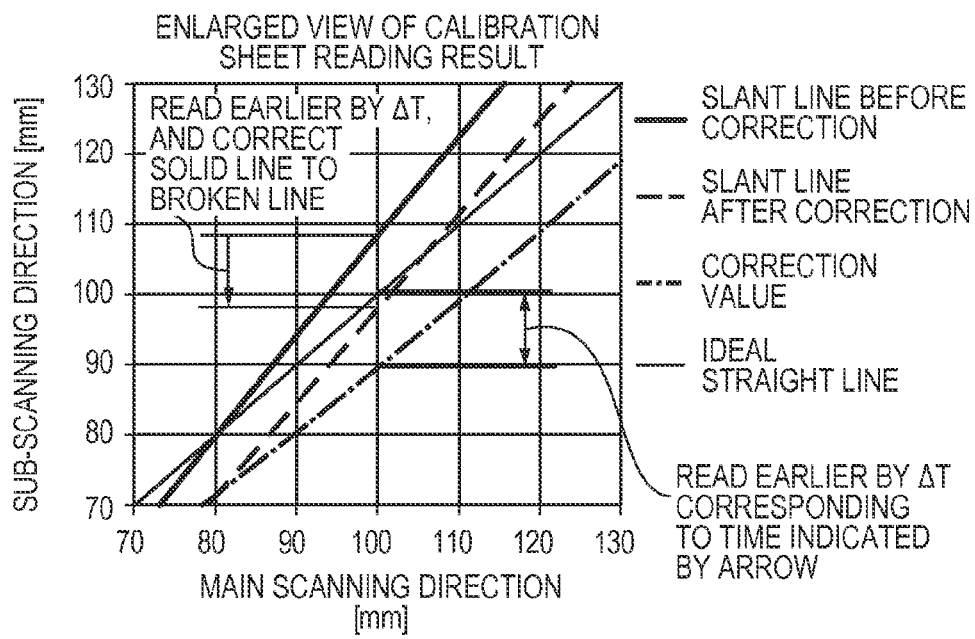
Figure 3C:
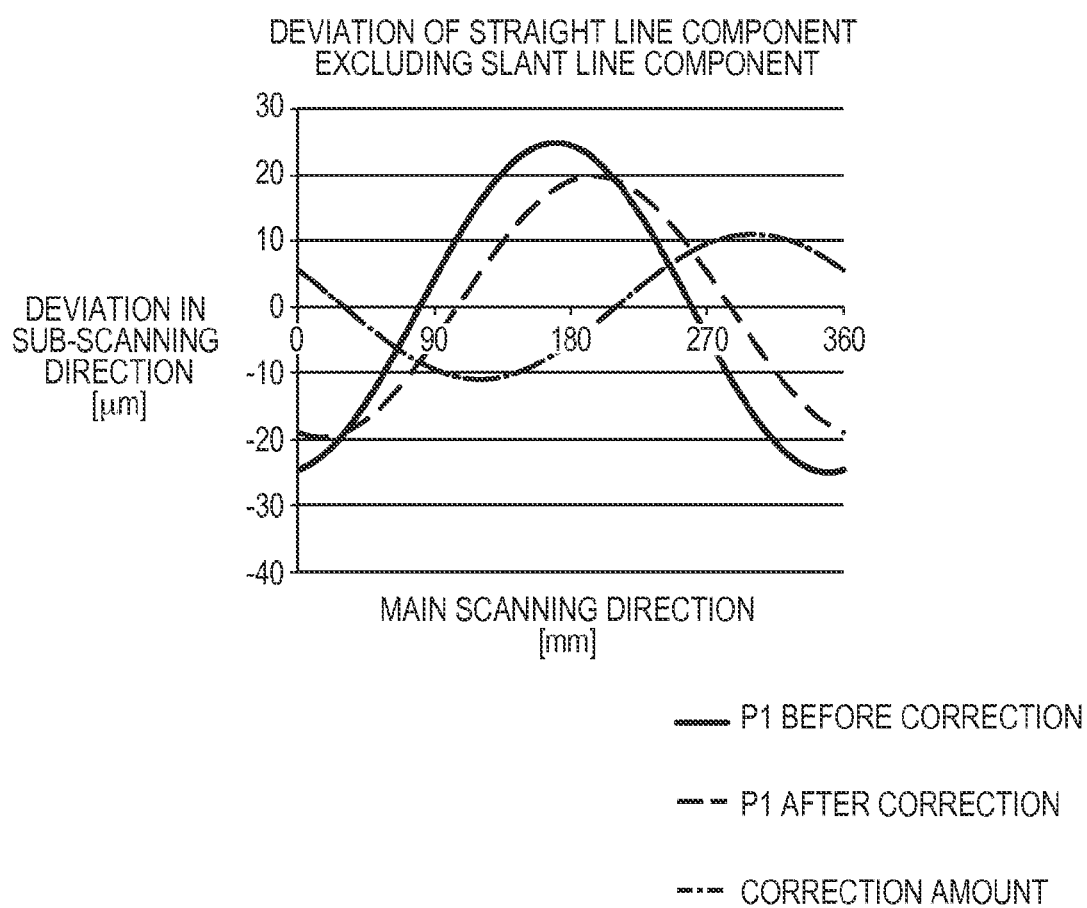

FIGS. 3A to 3C are graphs showing calibration sheet reading results.

In this example, the thick solid line indicates the slant line obtained before correction, the thin solid line indicates the slant line that should be, the alternate long and short dashed line indicates the correction amount, and the thick broken line indicates the slant line after correction. In this example, as a result of aiming at overall optimization, the slant line after correction also curves.

FIG. 3A shows an image represented by image data obtained from reading the calibration sheet with slant lines printed on it. Note that one slant line will be described here for the sake of simplicity. The abscissa added to the image represents the main scanning direction of the CIS, and the ordinate represents the sub-scanning direction (original conveyance direction).

FIG. 3B is an enlarged view of a circled portion in FIG. 3A. The difference between the alternate long and short dashed line and the thin line as the slant line that should be represents the correction value at that point of time. When the correction value is subtracted from the thick solid line, the broken line corresponding to the slant line after correction is obtained.

FIG. 3C shows the deviation obtained by removing the slant line component from these data. Referring to FIG. 3C, the straight line that should be is represented by a horizontal line without any deviation in the sub-scanning direction. FIG. 3C shows a deviation (unit: μm) with respect to this line. Letting P1 be a point of a CIS, the deviation at this position is illustrated. The solid line indicates the deviation at P1 before correction, the broken line indicates the deviation at P1 after correction, and the alternate long and short dashed line indicates the correction amount (adjustment amount).

Note that this mathematically means that when a sine wave having a different amplitude and phase is added to a sine wave having the same period, the resultant sine wave has the same period.

FIG. 4 is a timing chart showing a method of adding actual timing adjustment times of a CIS.

FIG. 4 shows digital signals used for the reading operation of the image reading apparatus in the vertical direction, and conceptually illustrates the analog value of the correction amount at a location n.

There has conventionally been made a proposal to provide an adjustment time for the activation signal of an optical reading element with respect to a reference signal. In this embodiment, an arrangement that freely sets the adjustment time at a plurality of positions in the main scanning direction of the CIS is employed.

In FIG. 4, for correction amounts at two portions (timing adjustment amounts at locations 1 and 2), reading timing signals SP1 and SP2 are made changeable, based on the set adjusted timing table, with respect to the leading edge of an encoder signal ENC indicating the conveyance position of the conveyance roller.

Originally, at location 1, the reading timing signal SP1 of the CIS rises at the leading edge of the encoder signal ENC. Accordingly, a lighting signal LED_R of a red LED is turned on in synchronism with a clock signal CIS_CLK (not shown) of the CIS. Next, a lighting signal LED_G of a green LED is turned on, and an analog signal R_OUT that is pixel information from the red LED is immediately output from an analog signal terminal VOUT.

Next, a lighting signal LED_B of a blue LED is turned on, and an analog signal G_OUT that is pixel information from the green LED is sequentially output from the same analog signal terminal VOUT in synchronism with the clock signal CIS_CLK. Then, the lighting signal LED_R of the red LED is turned on again, and an analog signal B_OUT that is pixel information from the blue LED is sequentially output from the same analog signal terminal VOUT in synchronism with the clock signal CIS_CLK. The above-described operation is repetitively performed to execute image reading.

In this embodiment, a timing adjustment portion is provided between the leading edge of the encoder signal ENC and each of the reading timing signals SP1 and SP2. The adjustment width is desirably set at a main scanning position of each CIS, for example, at location 1 or location 2. The reading start timing of each CIS is controlled in accordance with the deviation.

The example of FIG. 4 indicates that the interval between the pulse leading edge of the encoder signal ENC and the pulse leading edge of the reading timing signal SP1 increases every time the location 1_correction amount increases.

As described above, the reading start timing of each CIS is freely changed as many times as the number of CISs, and a deviation caused by shaft variation in the sub-scanning direction with respect to the reading position that should be can be corrected.

An example will be described next in which a composed image is generated by composing output signals from the CISs particularly arranged zigzag. Note that the CISs are arranged such that reading areas at ends of adjacent CISs overlap each other.

In a case where the CISs are calibrated using the calibration sheet, and the accurate front-to-back dimensions are measured, the images should be connected without any shift. However, since the variation of the conveyance roller changes every moment, the image positions in data to be connected are stored in the memory unit 5 with a shift. To prevent this, an adjusted timing table (correction table) is created such that the variations of the CIS connection portions have the same value.

Processing of equalizing the variations of overlapped portions, that is, equalizing the deviations of the slant lines upon using two CISs will be described here for the sake of simplicity.

Figure 5A:
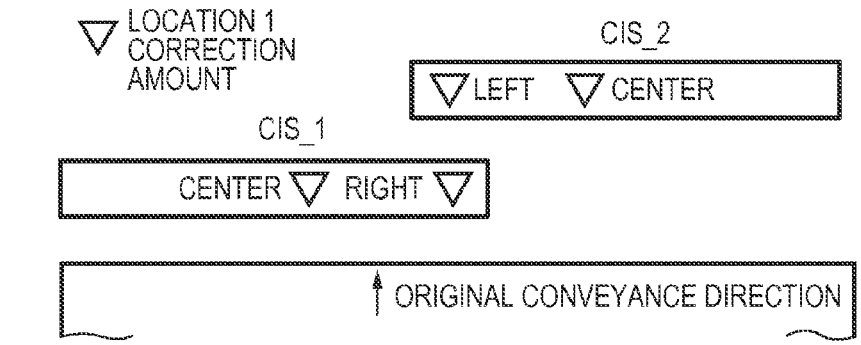
FIGS. 5A, 5B, and 5C are views showing the arrangement of an image reading unit formed from two CISs and the deviation in each CIS.
Figure 5B:
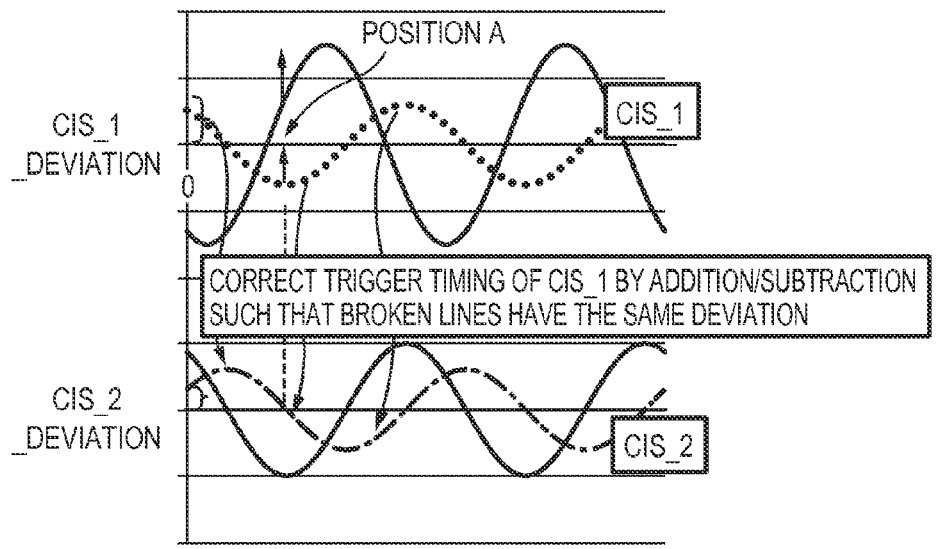
Figure 5C:
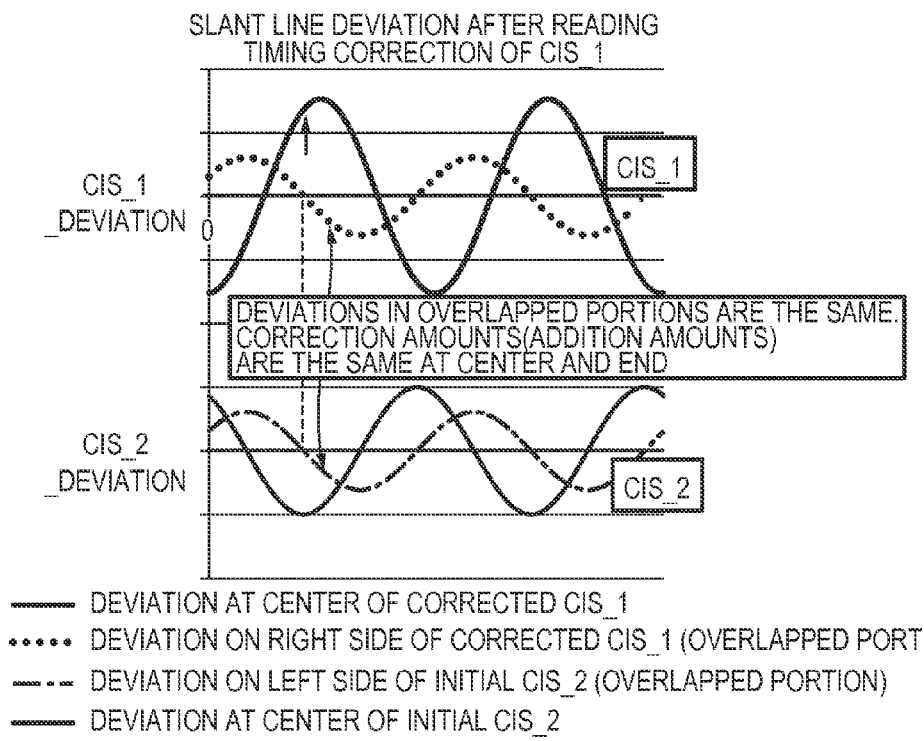

FIGS. 5A to 5C are views showing the arrangement of an image reading unit formed from two CISs and the deviation in each CIS.

FIG. 5A is a view for explaining the layout of two CISs.

As shown in FIG. 5A, the two CISs are arranged along the original conveyance direction and laid out such that their image reading areas partially overlap. That is, the reading area at the right end of CIS_1 and that at the left end of CIS_2 overlap, and an image is read using the two CISs. These overlapped areas are called CIS overlapped portions.

In this embodiment, deviations are measured at the center and the right end of CIS_1 and at the center and the left end of CIS_2.

An example will be described next in which not the reading timing of CIS_2 but the reading timing of CIS_1 is changed so as to equalize the deviations of the CIS overlapped portions.

FIG. 5B is a view showing slant line deviations at the measurement positions. In FIG. 5B, the abscissa represents an original conveyance amount (time), and the ordinate represents a deviation with respect to a slant line that should be. Note that the solid line of CIS_1 indicates a deviation that occurs at the center of CIS_1, and the dotted line indicates a deviation that occurs at the right end of CIS_1. The conveyance roller 1 is long, and its shaft variation changes depending on the location in the direction of the rotation axis. For this reason, the deviation changes even in a single CIS. The solid line of CIS_2 indicates a deviation that occurs at the center of CIS_2, and the alternate long and short dashed line indicates a deviation that occurs at the left end of CIS_2. As is apparent from FIG. 5B, although the deviation at the right end of CIS_1 and the deviation at the left end of CIS_2 have the same amplitude, the phases are different from each other. In this embodiment, the timing adjustment time is added to CIS_1 using the left end of CIS_2 as a reference.

More specifically, a correction amount is added to the deviation (dotted line) at the right end of CIS_1, thereby correcting the deviation to the same waveform as the deviation (alternate long and short dashed line) at the left end of CIS_2.

FIG. 5C is a view showing waveform after correction. In FIG. 5C, the ordinate and the abscissa have the same meanings as in FIG. 5B.

As can be seen from FIG. 5C, the deviation (dotted line) at the right end of CIS_1 and the deviation (alternate long and short dashed line) at the left end of CIS_2 have the same waveform.

In this embodiment, the same correction is applied to the center and the right end of CIS_1. That is, the same correction amount is added to control the reading timing signal. In the example shown in FIG. 5C, the deviation at the center of CIS_1 changes somewhat large. More specifically, at a position A in FIG. 5B, when a correction amount corresponding to the length of the thick arrow is added to the right end of CIS_1 along the ordinate, the deviation=0, like at the left end of CIS_2. The same amount as the correction amount is added to the center of CIS_1 as well. As a result, the deviation characteristic is corrected as shown in FIG. 5C.

As described above, using the deviation at an end of a CIS as a reference, the reading timing of another CIS arranged adjacently is corrected. In this case, the deviations at the overlapped portions can have always the same value. This is equivalent to a state in which the distance between the CISs remains unchanged at the CIS connection portion. It is therefore possible to generate a CIS connected image without any shift.

Note that the correction amount shown in FIG. 4 is the deviation of the conveyance roller. In FIGS. 5B and 5C, the ordinate represents correction=deviation and, in fact, the timing adjustment time. That is, if the deviation shown in FIGS. 5B and 5C is large, this is equivalent to largely delaying the reading timing to be corrected.

A method of improving the conveyance linearity of an entire read original, that is, reducing the shift component of the overall read image while making the deviations at the CIS connection portions match in both CISs will be described below.

Figure 6:
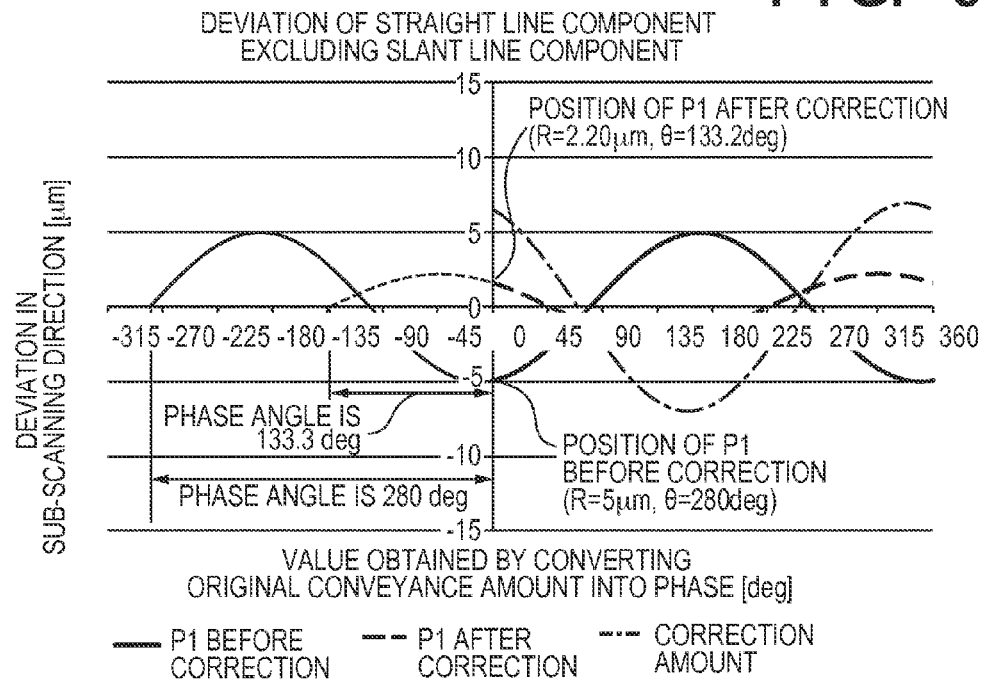
FIG. 6 is a view for explaining a method of displaying a deviation excluding a slant component at a decentering position.

FIG. 6 is a view for explaining a method of displaying a deviation excluding a slant component at a decentering position.

Referring to FIG. 6, the ordinate represents a deviation amount (correction amount) in µm. Upon reading an image original, the original is normally conveyed at a predetermined speed. Hence, the actual correction amount can be replaced with a time. The abscissa represents an original conveyance amount. The original conveyance amount is indicated by an angle based on one revolution of the conveyance roller through 360°.

FIG. 6 shows the same deviation as in FIG. 5C. The variation amount in one conveyance roller widely changes depending on the location in the direction of the rotation axis. However, the difference between the locations in the radial direction is negligible, and the deviation of the variation amount can be replaced with the variation amount at the shaft center position.

Referring to FIG. 6, the thick solid line indicates the slant line deviation before adjustment. The shaft center position is set with respect to the variation center of the shaft, and the rotation start position is represented by R=5 µm, θ=280° at the position P1 before correction. This can be understood from the fact that the thin solid line extended from the thick solid line on the right side of FIG. 6 indicates a deviation of 0 at −280°. If the alternate long and short dashed line is assumed to represent a correction value, the deviation corrected by adding the correction value is indicated by the broken line. Hence, R=2.2 µm, θ=133° at the position P1 after correction, that is, the phase advances by 133° at the rotation start position after connection.

Figure 7:
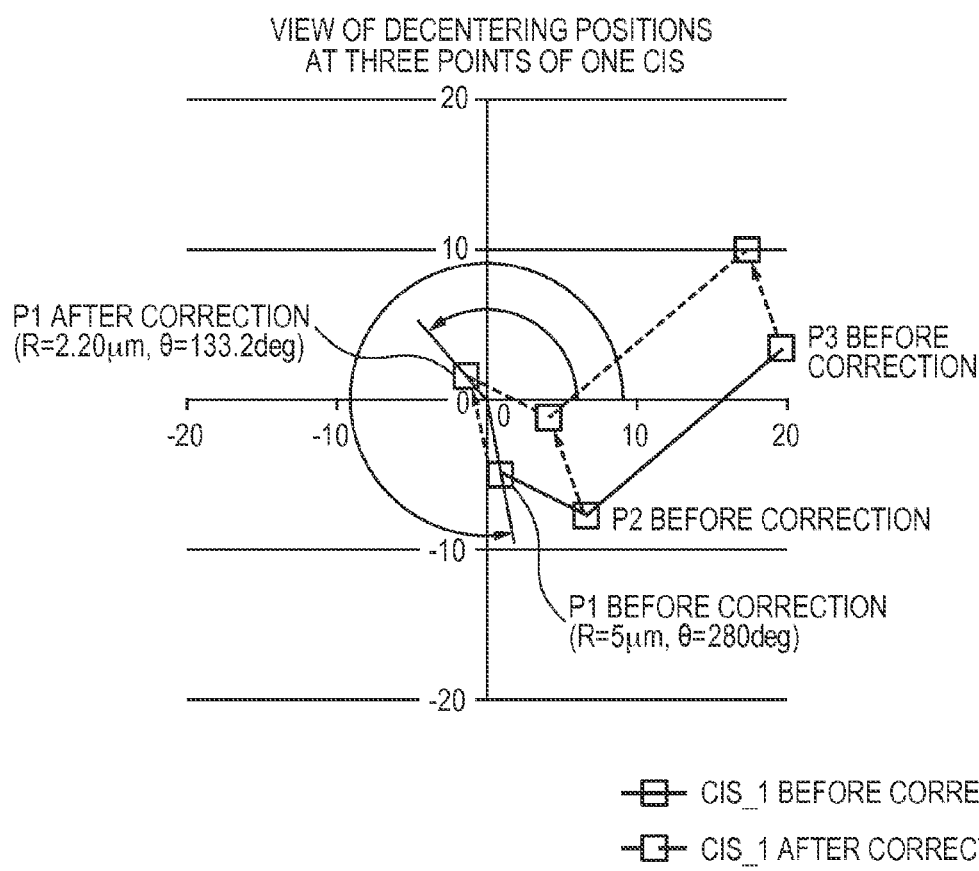
FIG. 7 is a view of a decentering position, which shows changes before and after correction.

FIG. 7 is a view of a decentering position, which shows changes before and after correction. FIG. 7 shows how the decentering of the conveyance roller is changed by the above-described correction. In FIG. 7, both the ordinate and the abscissa represent the shaft center position by X and Y in µm.

FIG. 7 shows how the decentering amounts at different position P1 (left end), P2 (center), and P3 (right end) in one CIS (here, CIS_1) are changed by correction. FIG. 7 shows that the decentering becomes small as the distance to the origin decreases, and large as the distance increases.

Referring to FIG. 7, at the position P1 before correction, a position represented by R=5 µm and θ=280° is the rotation start position of the conveyance roller. This means that the angle of counterclockwise rotation from 0° in directions of Y=0 and X=∞ is 280°. The rotation center is set to X (abscissa)=0 and Y (ordinate)=0, and the conveyance roller rotates starting from the position represented by R=5 µm and θ=280°. Similarly, at the position P1 after correction, a position represented by R=2.2 µm and θ=133° is the rotation start position. The measurement positions of CIS_1 are P1 (left end), P2 (center), and P3 (right end). Each point is set to the rotation start position. As described above, the rotation center is set to X (abscissa)=0 and Y (ordinate)=0, and the conveyance roller rotates without changing the relative positional relationship between the points.

The relative decentering positions between the points are features of the mechanical structure. Relative positions represented by polar coordinates (R, θ) do not change. That is, in a case where the reading timing of a CIS is adjusted with respect to the relative positions, and the decentering amount is corrected as image data, the points P1, P2, and P3 can be represented by translation in FIG. 7.

As described above, the position P1 changes from (R=5 μm and θ=280°) to (R=2.2 μm and θ=133° before and after correction. This means that a displacement (ΔX, ΔY) on an orthogonal decentering coordinate system (X, Y) is calculated by $$\Delta X = -5 \times \cos(280) + 2.2 \times \cos(133)$$
$$= -2.4 \; \mu m$$
$$\Delta Y = 5 \times \sin(280) - 2.2 \times \sin(133)$$
$$= 6.5 \; \mu m$$

The remaining two points P1 and P2 can also be calculated as translation.

A method of improving the linearity of an entire image original (method of making the absolute value of an overall variation small) while equally correcting the variations at the CIS connection portions will be described next.

First, the variation phases at the CIS connection portion are adjusted based on the explanation of FIGS. 6 and 7.

FIG. 8 is a table showing correction states before and after various kinds of correction at each decentering position of CIS_1, CIS_2, and CIS_3 based on the condition shown in FIG. 7. Referring to FIG. 8, the left end is represented by P1, the center by P2, and the right end by P3 for each CIS.

Assume that on the orthogonal decentering coordinate system (X, Y), P1, P2, and P3 are in the following states in the initial state (before correction). That is,

P1: X=0.9 μm, Y=−4.9 μm
P2: X=6.4 μm, Y=−7.7 μm
P3: X=19.7 μm, Y=3.5 μm

These coordinates are converted and expressed on the polar coordinate system (R, θ) as follows. That is,

P1: R=5 μm, θ=280°
P2: R=10 μm, θ=310°
P3: R=20 μm, θ=10°

The positions P1, P2, and P3 have been described with reference to FIGS. 3 and 7. When sine waves having the same period but different amplitudes and phases are added, a sine wave having the same period is obtained. This is equivalent to translating all the decentering positions expressed on the polar coordinate system at the three points P1, P2, and P3 on the (X, Y) coordinate system in FIG. 7. That is, when variations at a plurality of points are measured in one CIS, variation correction for one point can be expressed as shifting each plot point by the same vector in FIG. 7.

For example, focus the position P3. When this point is shifted by −2.4 μm in the X direction and 6.5 μm in the Y direction, the position changes to R=20 μm and θ=30° on the polar coordinate system, as can be calculated.

This can be calculated as $$R = \{(19.7 - 2.4)^2 + (3.5 + 6.5)^2\}^{1/2}$$
$$= 20.0 \; \mu m$$
$$\theta = \arctan\{(3.5 + 6.5)/(19.7 - 2.4)\}$$
$$= 30.0°$$

Similarly, in a case where a variation deviation at one point is corrected, the remaining points can also be calculated.

A method of reducing the variation in the entire conveyance roller based on the above explanation will be described next.

With reference to FIG. 13, a general process for reducing the variation over the entire conveyance roller will be described first.

At step S110, a user feeds a calibration chart, in which a slanting line is drawn, to the image reading apparatus. At step S120, each of the CISs 2a, 2b and 2c in the image reading apparatus reads the calibration chart to obtain image data. At step S130, the image processing unit 4 uses the image data to calculate an optimum value of a correction amount for decentering, and determines the correction amount at step S140.

Next, with reference to FIG. 14, a detailed process of determining the correction amount for decentering will be described.

As described with reference to FIG. 13, a users feeds a calibration sheet so that each CIS reads the calibration sheet at step S120. At step 131, the image processing unit 4 calculates decentering vectors at a right end, center, and left end of each CIS, based on a degree of bend of the slanting line.

Since the CISs are arranged zigzag and the conveyance roller for conveying an original is lengthy, how the decentering occurs in the conveyance roller differs in a direction in which the CISs are arranged. To seamlessly connect images formed by end portions of the CISs which are arranged zigzag, it is necessary to match the decentering amount and the phase of variation in the end portions. For this reason, at step S132, the image processing unit 4 uses a decentering vector of one CIS as a reference, and determines, based on the reference, CIS-specific correction vectors so that the decentering vector at an end portion of each CIS match a decentering vector at an adjacent end portion of the adjacent CIS.

This operation makes it possible for decentering vectors at end portions of each CIS to match with each other. This makes connections of images obtained by the respective CISs better.

To further reduce variations of each point of each CIS, the following approach is employed. More specifically, this embodiment adds a common correction vector as a whole under condition that the decentering vectors of the end portions of the CISs match each other.

For example, consider a case where a center position of decentering is corrected by +/−30 μm as a whole. In this case, the image processing unit 4 determines a combination of N common correction vectors such as (30, 30), (30, 29), (30, 28), . . . , (0, 0), . . . , (−30, −28), (−30, −29), (−30, −30) at step S133A.

From the combination, the image processing unit 4 select one vector, for example, (30, 30) at step S133B, and adds it to the determined CIS-specific correction vector at step S133.

In this state, the image processing unit 4 newly calculates a minimum circumscribed circle from the respective points, calculates its variation amount, and stores it at step S134.

At step S134A, the image processing unit 4 selects another common correction vector, for example, (30, 29).

Next, the image processing unit 4 repeatedly performs calculation according to steps S133, S134 and S134A so as to calculate variation amounts on all correction vectors included in the combination and store them to the memory unit 5.

At step S135, the image processing unit 4 compares N variation amounts with each other, and selects a minimum value obtained from the above comparison as a common correction vector, and determines final vectors by adding the common correction vector to the above-mentioned CIS-specific correction vectors.

Figure 14:
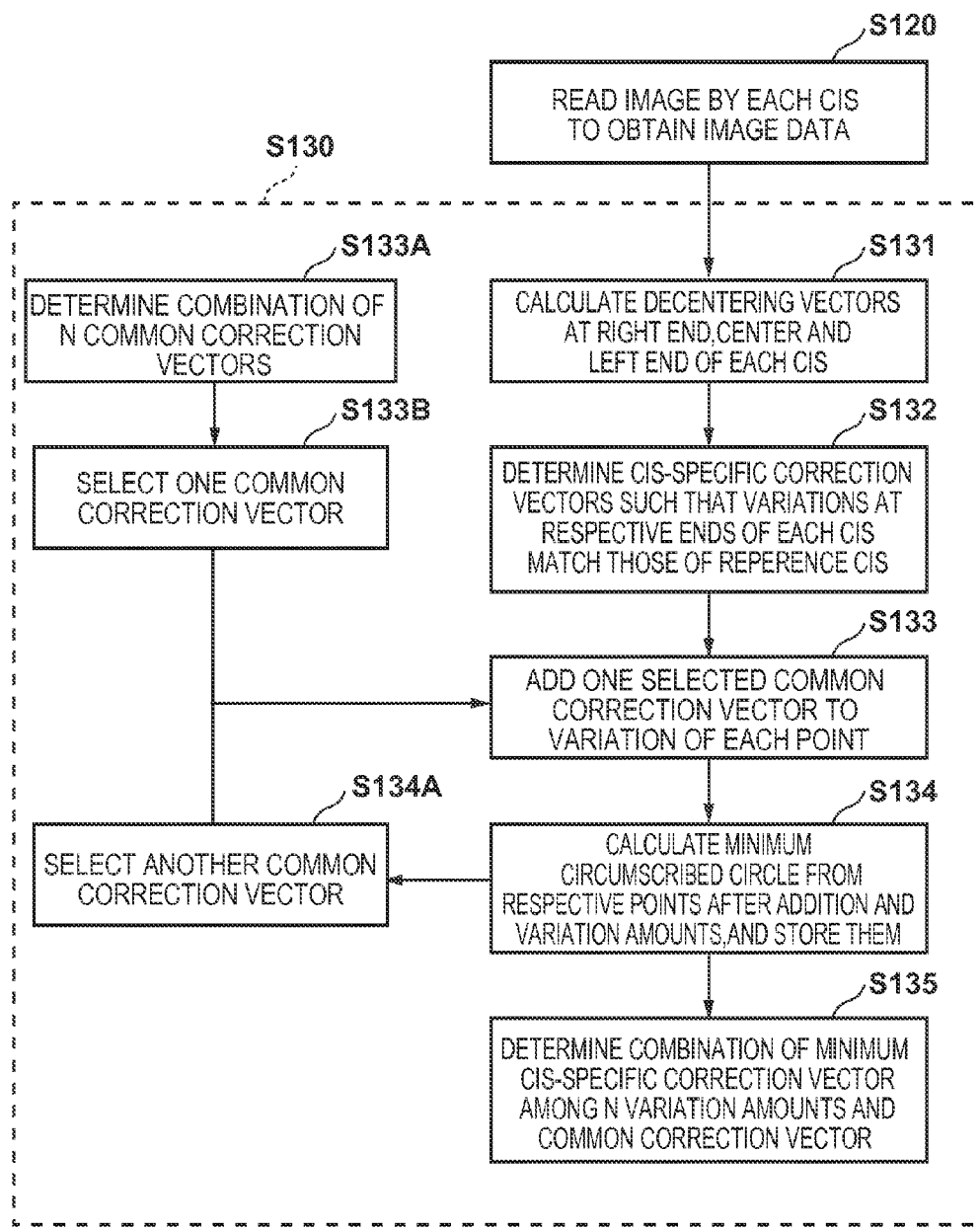
FIG. 14 is a flowchart showing the detailed process of correcting shaft center positions shown in FIGS. 9A, 9B and 9C.

An example will be described here in which the method explained with reference to FIGS. 7, 13 and 14 is applied to decentering correction in three actual CISs, and the variation amount in the entire conveyance roller is minimized.

Figure 9A:
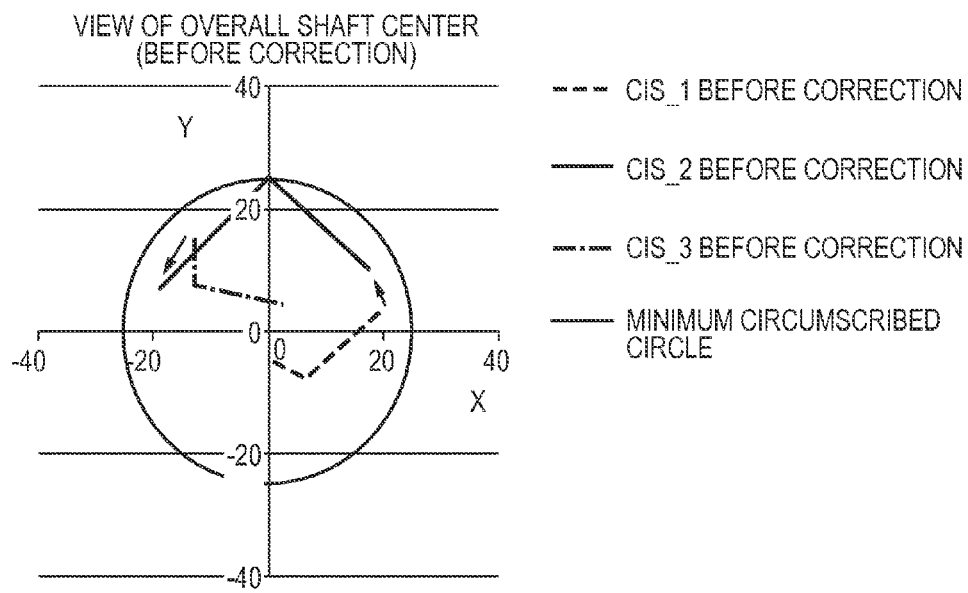
FIGS. 9A, 9B, and 9C are views showing information in FIG. 8 as shaft center positions.
Figure 9B:
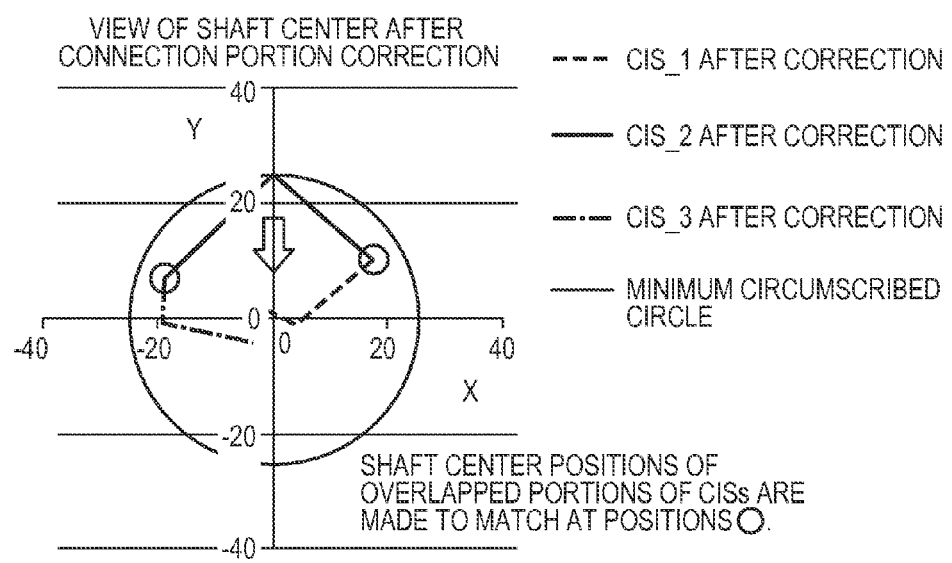
Figure 9C:
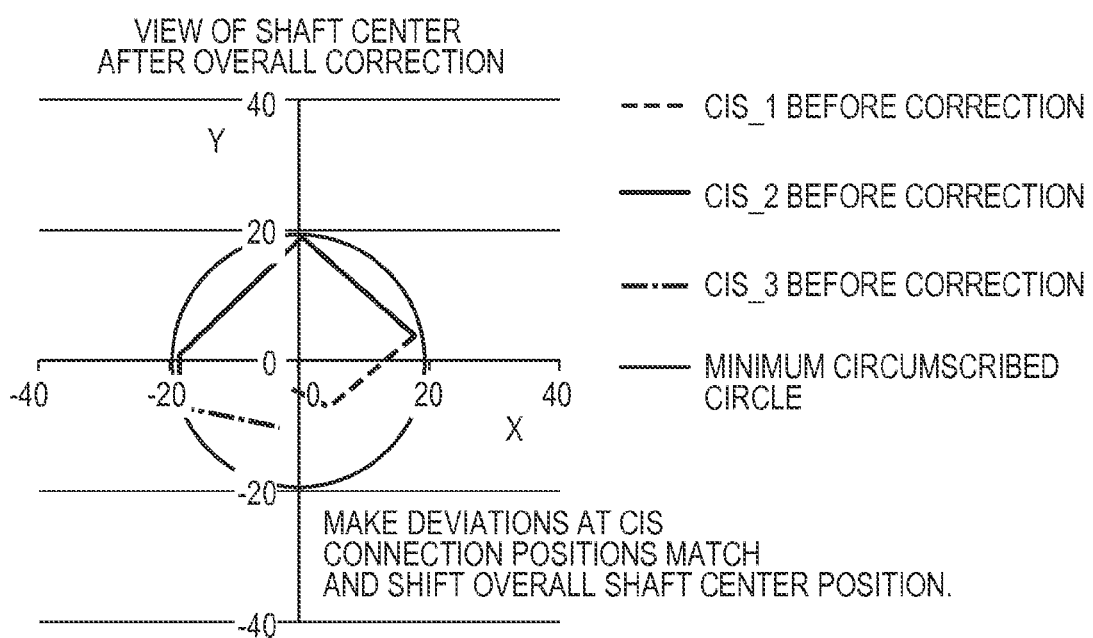

FIGS. 9A to 9C are views showing information in FIG. 8 as shaft center positions. Referring to FIGS. 9A to 9C, the ordinate and the abscissa represent positions by μm, like FIG. 7, and the shaft center position is represented by X and Y.

FIG. 9A is a view showing the shaft center positions of CIS_1, CIS_2, and CIS_3 in the initial state (before correction). In this state, the connection portions of the CISs has the same distance from the rotation center, but only the phases are different. An arrow shown in FIG. 9A indicates a correction vector to be shifted. Since the actual shaft center position rotates by 360° with respect to zero or zero reference, the variation is maximized at a position (here, X=0 μm and Y=25 μm) farthest from the rotation center, and the maximum variation value is 50 μm.

FIG. 9B shows a state in which the phases at the connection positions of the CISs are adjusted, and the shaft center positions are made to match. This is the result of correcting the shaft center positions in accordance with the method described with reference to FIG. 6. CIS_1 and CIS_3 are translated by adjusting the timing adjustment time. FIG. 9B also shows a state where the respective CIS-specific correction vectors as determined in step S132 of FIG. 14 are applied.

FIG. 9C shows the result of performing correction by translating the whole chart of decentering downward. A point of the maximum variation is the position P2 of CIS_2, and R=19.5 μm. Although the initial variation is 50 μm, the variation is reduced to 39 μm while improving connection of CISs. FIG. 9C also shows a state where steps S133, S134 and S134A of FIG. 14 are performed, and correction is made by applying the final vectors determined at step S135 of FIG. 14.

Figure 10A:
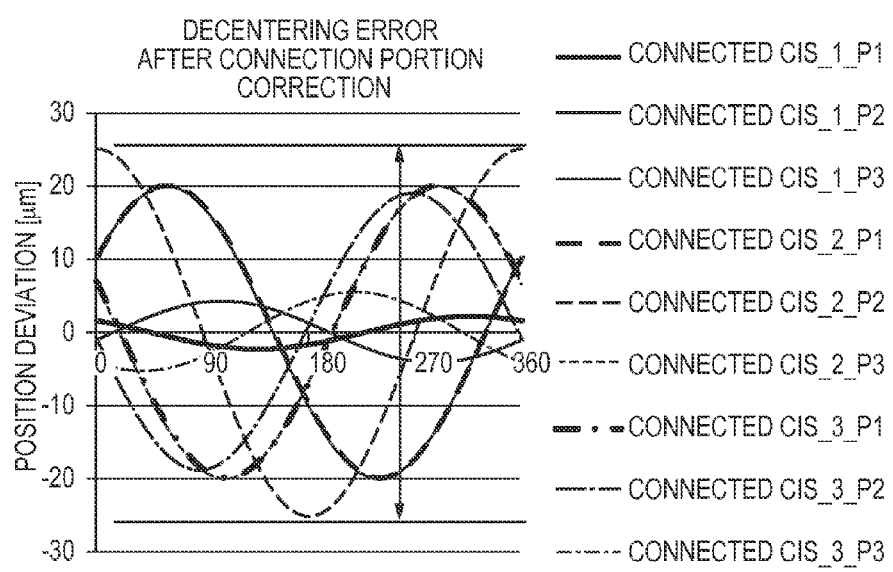
FIGS. 10A and 10B are views showing decentering errors after correction.
Figure 10B:
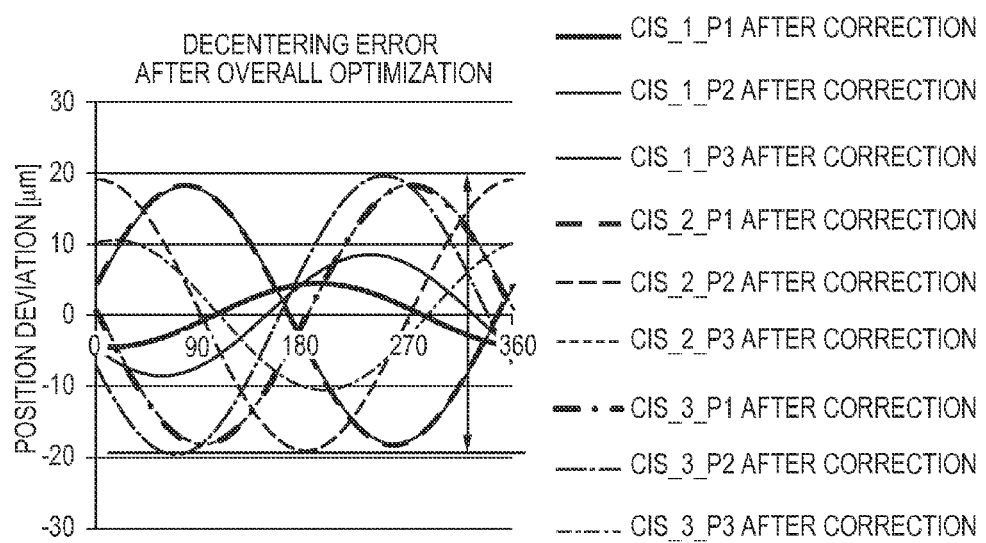

FIGS. 10A and 10B are views showing decentering errors after correction.

FIG. 10A shows the deviation state at each point of each CIS after the CIS connection portions are corrected in correspondence with FIG. 9B. FIG. 10B is a view showing the deviation state at each point of each CIS after correcting the whole CISs in correspondence with FIG. 9C. FIG. 10B shows the actual decentering state. Referring to FIGS. 10A and 10B, the ordinate represents the deviation amount of the shaft center by μm, and the abscissa represents the original conveyance amount, that is, a value obtained by converting the circumference of the conveyance roller to 360°.

In FIG. 10A, the variations of the connection portions of the CISs match. That is, FIG. 10A shows that the variations overlap between P3 of CIS_1 and P1 of CIS_2 and between P3 of CIS_2 and P1 of CIS_3. FIG. 10B shows that the variations overlap and match between P3 of CIS_1 and P1 of CIS_2 and between P3 of CIS_2 and P1 of CIS_3, and the absolute value of the entire variation becomes small.

Hence, according to the above-described embodiment, correction is done using a change in a deviation at an end of one CIS sensor as a reference such that the deviations that occur at both ends of each of the plurality of CIS sensors change similarly, thereby reducing the deviation in the overall conveyance roller.

Note that in the above-described embodiment, the image reading apparatus for reading a long original uses line-type reading sensors (CISs) in which a plurality of CISs are arranged zigzag. However, the present invention is not limited to this. For example, the present invention is applicable to any arrangement that arrays a plurality of image reading elements and can adjust the reading start timing of each element. The sensor used can have any structure as long as the sensor is a line-type reading sensor.

In the above-described embodiment, an image reading apparatus such as a large format scanner that reads a large original has been exemplified. However, the present invention is also applicable to a large format MFP apparatus constructed by connecting a large format printing apparatus to the image reading apparatus.

In addition, the present invention is not limited by the size of the apparatus. The present invention is also applicable to a consumer-oriented scanner device for reading an A3 or A4 original or an MFP apparatus incorporating that device in a printing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-078228, filed Apr. 4, 2014, which is hereby incorporated by reference herein in its entirety.

What is claimed is:

1. An image reading apparatus that reads an image of an original, comprising:
   a plurality of line reading sensors, each formed by arraying a plurality of reading elements, which are arranged in a direction the plurality of reading elements are arrayed and used for reading the image of the original;
   a conveyance roller for conveying the original in a direction different from the direction in which the plurality of reading elements are arrayed;
   a drive unit configured to drive said conveyance roller;
   a detection unit configured to detect a shift, that occurs at each of both ends of a reading area of each of the plurality of line-type reading sensors, from an image position in a predetermined calibration sheet corresponding to a rotation angle of the conveyance roller, for each of a plurality of positions of the plurality of line-type reading sensors, from image data obtained by reading the calibration sheet by the plurality of line-type reading sensors while causing said drive unit to drive said conveyance roller and conveying the calibration sheet; and
   an adjustment unit configured to adjust, using the detected shift at an end of one of the plurality of line-type reading sensors as a reference, reading at an end of another line-type reading sensor so as to reduce a difference of the shift from the reference.

2. The apparatus according to claim 1, wherein said adjustment unit further adjusts a shift that occurs at a center of a reading area of each of the plurality of line-type reading sensors using the same amount as an adjustment amount for the shift at the end.

3. The apparatus according to claim 1, wherein said adjustment unit adjusts a reading timing of each of the plurality of reading elements.

4. The apparatus according to claim 3, wherein said adjustment unit performs the adjustment during a period between an encoder signal representing a conveyance position of said conveyance roller and a reading timing signal representing the reading timing.

5. The apparatus according to claim 1, wherein the line-type reading sensor comprises a CIS sensor, and
an image reading unit is formed by arraying a plurality of CIS sensors zigzag in the direction in which the CIS sensors are arrayed.

6. The apparatus according to claim 5, wherein out of the plurality of CIS sensors, adjacent CIS sensors have reading areas overlapped at respective ends.

7. The apparatus according to claim 1, further comprising a memory unit configured to store a correction table for correcting the shift.

8. The apparatus according to claim 1, wherein the shift is expressed by a polar coordinate system formed from an angle and a distance from a rotation center of said conveyance roller, and
adjustment by said adjustment unit is done by translating each of a plurality of positions on the polar coordinate system.

9. An image reading apparatus comprising:
a conveyance roller, used for conveying an original to be read in a first direction, having a rotation axis in a second direction intersecting with the first direction;
a reading unit including a first reading sensor and a second reading sensor, each having a plurality of reading elements arrayed in the second direction, wherein the first reading sensor and the second reading sensor are arranged in the second direction in an area corresponding to said conveyance roller, and the first reading sensor and the second reading sensor are arranged shifted to each other in the second direction so as to align a reading element at an end of the first reading sensor and a reading element at an end of the second reading sensor in the second direction; and
an obtaining unit configured to obtain information on a rotation angle of said conveyance roller in a case where said conveyance roller conveys the original and a conveyance error corresponding to the rotation angle in a position of said conveyance roller corresponding to the end of the second reading sensor; and
a correction unit configured to, based on the information obtained by said obtaining unit, correct a relative difference between a reading timing of the reading element at end of the first reading sensor and that of the reading element at end of the second reading sensor.

10. The apparatus according to claim 9, wherein said correction unit determines a correction amount for correcting the relative difference between the reading timings of the reading elements which are adjacent to each other at the end of the first reading sensor and at the end of the second reading sensor, and changes the determined correction amount such that a maximum amplitude of a reading error of the original derived from the conveyance error in the first reading sensor and the second reading sensor becomes minimum.

11. The apparatus according to claim 10, wherein said correction unit applies a same correction amount to reading elements at a center and both ends of one of the first reading sensors and the second reading sensors.

12. The apparatus according to claim 9, wherein said obtaining unit obtains the information based on a result of reading a calibration sheet conveyed by said conveyance roller.

13. A correction method of an image reading apparatus that arrays a plurality of reading elements to form a line-type reading sensor, arranges a plurality of line-type reading sensors in a direction in which the plurality of reading elements are arrayed, and reads an image of an original by the plurality of line-type reading sensors while conveying the original in a direction different from the direction in which the plurality of reading elements are arrayed, the method comprising:
detecting a shift, that occurs at each of both ends of a reading area of each of the plurality of line-type reading sensors, from an image position in a predetermined calibration sheet corresponding to a rotation angle of a conveyance roller, for each of a plurality of positions of the plurality of line-type reading sensors, from image data obtained by reading the calibration sheet by the plurality of line-type reading sensors while causing a drive unit to drive the conveyance roller and conveying the calibration sheet; and
using the detected shift at an end of one of the plurality of line-type reading sensors as a reference, adjusting reading at an end of another line-type reading sensor so as to reduce a difference of the shift from the reference.

14. The method according to claim 13, wherein in the adjusting, a shift that occurs at a center of a reading area of each of the plurality of line-type reading sensors is adjusted using the same amount as an adjustment amount for the shift at the end.

15. The method according to claim 13, wherein in the adjusting, a reading timing of each of the plurality of reading elements is adjusted.

16. The method according to claim 15, wherein in the adjusting, the adjustment is performed during a period between an encoder signal representing a conveyance position of the conveyance roller and a reading timing signal representing the reading timing.

17. The method according to claim 13, further comprising using a correction table for correcting the shift.

18. The method according to claim 13, wherein the shift is expressed by a polar coordinate system formed from an angle and a distance from a rotation center of the conveyance roller, and
the adjusting is done by translating each of a plurality of positions on the polar coordinate system.

19. A correction method for an image reading apparatus including: a conveyance roller, used for conveying an original to be read in a first direction, having a rotation axis in a second direction intersecting with the first direction; and a reading unit including a first reading sensor and a second reading sensor, each having a plurality of reading elements arrayed in the second direction, wherein the first reading sensor and the second reading sensor are arranged in the second direction in an area corresponding to the conveyance roller, and the first reading sensor and the second reading sensor are arranged shifted to each other in the second direction so as to align a reading element at an end of the first reading sensor and a reading element at an end of the second reading sensor in the second direction, comprising:
obtaining information on a rotation angle of the conveyance roller in a case where the conveyance roller conveys the original and a conveyance error corresponding to the rotation angle in a position of the conveyance roller corresponding to the end of the second reading sensor; and
correcting, based on the obtained information, a relative difference between a reading timing of the reading element at end of the first reading sensor and that of the reading element at end of the second reading sensor.

20. The method according to claim 19, wherein a correction amount for correcting the relative difference between the reading timings of the reading elements which are adjacent to each other at the ends of the first reading sensor and the second reading sensor is determined, and the determined correction amount is changed such that a maximum amplitude of a reading error of the original derived from the conveyance error in the first reading sensor and the second reading sensor becomes minimum.

21. The method according to claim 20, wherein a same correction amount is applied to reading elements at a center and both ends of one of the first reading sensors and the second reading sensors.

22. The method according to claim 19, wherein the information is obtained, based on a result of reading a calibration sheet conveyed by the conveyance roller.

* * * * *